United States Patent
Zhou et al.

(10) Patent No.: US 9,409,116 B2
(45) Date of Patent: Aug. 9, 2016

(54) POROUS POLYMER NETWORK MATERIALS

(71) Applicant: THE TEXAS A&M UNIVERSITY SYSTEM, College Station, TX (US)

(72) Inventors: Hong-Cai Zhou, College Station, TX (US); Julian Sculley, College Station, TX (US); Weigang Lu, College Station, TX (US)

(73) Assignee: The Texas A&M University System, College Station, TX (US)

( * ) Notice: Subject to any disclaimer, the term of this patent is extended or adjusted under 35 U.S.C. 154(b) by 60 days.

(21) Appl. No.: 14/405,653

(22) PCT Filed: Dec. 13, 2012

(86) PCT No.: PCT/US2012/069472
§ 371 (c)(1),
(2) Date: Dec. 4, 2014

(87) PCT Pub. No.: WO2013/184162
PCT Pub. Date: Dec. 12, 2013

(65) Prior Publication Data
US 2015/0182903 A1    Jul. 2, 2015

Related U.S. Application Data

(60) Provisional application No. 61/655,056, filed on Jun. 4, 2012.

(51) Int. Cl.
*B01D 53/02* (2006.01)
*F17C 11/00* (2006.01)
(Continued)

(52) U.S. Cl.
CPC ............... *B01D 53/04* (2013.01); *B01D 53/02* (2013.01); *B01J 20/265* (2013.01); *B01J 20/267* (2013.01);
(Continued)

(58) Field of Classification Search
CPC .. B01D 53/02; B01D 53/04; B01D 2253/202; B01D 2253/20; B01D 2256/10; B01D 2257/504; B01D 2257/7025; B01D 2259/4525; B01J 20/265; B01J 20/267; B01J 20/28066; C08J 2365/00; C08J 2382/00; C08J 2385/00; C08J 9/00; F17C 11/00; Y02C 10/08; Y02C 20/20; Y02P 20/152; Y02P 20/156
USPC .......... 96/108; 95/90, 139; 206/0.7; 423/230; 502/526
See application file for complete search history.

(56) References Cited

U.S. PATENT DOCUMENTS 8,876,953 B2 * 11/2014 Yaghi ..................... B01D 53/02
502/401
8,974,578 B2 * 3/2015 Kanatzidis ............. B01J 20/262
210/688

(Continued)

OTHER PUBLICATIONS

Search Report and Written Opinion of the International Searching Authority (ISA/US) for PCT/US2012/069472; dated Aug. 14, 2013.
(Continued)

*Primary Examiner* — Frank Lawrence
(74) *Attorney, Agent, or Firm* — Reising Ethington P.C.

(57) ABSTRACT

Functionalized Porous Polymer Networks (PPNs) exhibiting favourable characteristics such as high surface area' and gas uptake properties are disclosed, including methods of making such networks. A method of preparing a porous polymer network, comprising: (a) a step of homo-coupling a monomer in the presence of 2,2'-bipyridyl, 1,5-cycloocta-1,5-diene, a mixed solvent of DMF/THF and a compound or mixture selected from the group consisting of bis(1,5-cydoocta-1,5-diene)nickel(0), Ni(PPH3) 4, and Zn/NiCI2/NaBr/PPH3 at a temperature in the range of 20 to 40° C. These stable PPNs may be useful in the context of carbon capture, gas storage and separation, and as supports for catalysts.

20 Claims, 7 Drawing Sheets

(51) Int. Cl.
*B01D 53/04* (2006.01)
*C08J 9/00* (2006.01)
*B01J 20/26* (2006.01)
*B01J 20/28* (2006.01)

(52) U.S. Cl.
CPC .............. *B01J 20/28066* (2013.01); *C08J 9/00* (2013.01); *F17C 11/007* (2013.01); *B01D 2253/202* (2013.01); *B01D 2256/10* (2013.01); *B01D 2257/504* (2013.01); *B01D 2257/7025* (2013.01); *B01D 2259/4525* (2013.01); *C08J 2365/00* (2013.01); *C08J 2383/00* (2013.01); *C08J 2385/00* (2013.01); *Y02C 10/08* (2013.01); *Y02C 20/20* (2013.01); *Y02P 20/152* (2015.11); *Y02P 20/156* (2015.11)

(56) References Cited

U.S. PATENT DOCUMENTS

| | | | | |
|---|---|---|---|---|
| 2009/0023828 | A1* | 1/2009 | Yu | C01B 3/0015 521/189 |
| 2009/0062409 | A1* | 3/2009 | Matzger | C07F 3/003 521/50 |
| 2010/0143693 | A1* | 6/2010 | Yaghi | B01D 53/02 428/305.5 |
| 2010/0331436 | A1 | 12/2010 | Qiu et al. | |
| 2012/0128842 | A1* | 5/2012 | Jonsson | A23L 1/0156 426/286 |
| 2013/0047849 | A1* | 2/2013 | Zhang | B01D 53/02 95/130 |

OTHER PUBLICATIONS

Zhou. A Biometric Approach to Metal-Organic Frameworks with High H2 Uptake, May 12, 2010.

Lu et al. Sulfonate-Grafted Porous Polymer Networks for Preferntial CO2 Adsorption at Low Pressure. Journal of the Americal Chemical Society 133: 18126-18129, 2011.

Yuan et al. Highl Stable Porous Polymer Networks with Exceptionally High Gas-Uptake Capacities. Advanced Materials 23:3723-3725, 2011.

* cited by examiner

POROUS POLYMER NETWORK MATERIALS

STATEMENT REGARDING FEDERALLY SPONSORED RESEARCH OR DEVELOPMENT

This invention was made with government support under DE-AR0000073 awarded by the U.S. Dept. of Energy. The government has certain rights in the invention.

FIELD OF INVENTION

The present invention relates to porous polymer network materials (PPNs). In particular, the invention relates to porous polymer network materials comprising a functional group, and methods of preparing same.

SUMMARY OF INVENTION

Rising atmospheric $CO_2$ levels and its impact on global ecosystems have been strongly correlated to the combustion of fossil fuels. A number of potential solutions for conservation and remediation of the environment due to the impacts of $CO_2$ release are under consideration. These include carbon capture and sequestration (CCS), a process which separates $CO_2$ from the flue gas of coal-fired power plants and stores the $CO_2$ underground, as well as the utilization of cleaner fuels, such as methane ($CH_4$) or hydrogen ($H_2$).

Current $CO_2$ capture processes employed in power plants worldwide include post-combustion 'wet scrubbing' methods, which involve chemical adsorption of $CO_2$ by amine solutions such as mono-ethanolamine (MEA). This process requires the amine solutions to chemically react with $CO_2$, forming carbamates, which results in the scrubber having a high capacity and selectivity for $CO_2$. However, this process exhibits some significant drawbacks. In particular, a large amount of energy is required to regenerate the system and the amine solutions are highly corrosive, each of which can pose significant problems during extended operation.

To sidestep the huge energy demand, corrosion problem, and other limitations associated with traditional wet scrubbers, research attention has focussed on the use of solid absorbents as an alternative approach. Compared to the conventional scrubbing technique described above, in which a large amount of water must be heated and cooled during the regeneration of the dissolved amines, it has been found that the solid absorbent approach improves the energy efficiency of the regeneration process by eliminating the need to heat water.

Furthermore, due to depletion of fossil oil deposits in recent years, clean energy research has also focussed on developing methods to efficiently trap and store gas molecules, such as $H_2$ and $CH_4$. While $CH_4$ combustion does still produce $CO_2$, it is much cleaner burning than petroleum-based fuels. The preeminent factor preventing the commercialization of these fuels is the discovery of effective methods to reversibly store these energy related gases.

The two common methods of gas storage are liquefaction at low temperature and compression at room temperature. These methods are expensive and pose risks. To overcome these problems, research into adsorption technologies, where a guest species adheres to the surface of materials, forming a layer of adsorbed molecules, has been proposed. While the use of porous materials in $H_2$ storage devices is yet be fully realized, the storage of methane at relatively low pressure and ambient temperature in porous sorbents is presently an achievable goal.

Porous materials have been deemed to be viable storage alternatives for gas molecules, such as $CO_2$ and $CH_4$, because of their high porosity and therefore significantly increased accessible contact area with gas molecules. This enables separation of a selected gas from a mixture of gases, storage of a selected gas or gases and regeneration of the porous material to be performed under relatively mild conditions compared to amine wet scrubbing systems. In particular, metal-organic frameworks (MOFs), which possess discrete or extended structures in which the pore size and cavities of the materials have been configured for trapping a single molecule, as described for example in Furukawa et al., Science, 2010, 329, 424-428, have been investigated. In addition, porous polymer networks, which are generated from tetrahedral monomers which when polymerized provide a default diamondoid framework topology having wide openings and interconnected pores with limited 'dead space', have also been considered as viable storage alternatives for gas molecules such as $CO_2$ and $CH_4$. Unfortunately, only moderate $CH_4$ and $CO_2$ uptake capacities have been observed in the art under carbon capture conditions. In addition, many porous materials suffer from limited stability and high regeneration energy requirements, which hamper their practical application for gas separation and storage.

Accordingly, there is a need for new materials which can obviate or mitigate some of the disadvantages associated with the prior art. For instance, it would be beneficial to provide materials which show high selectivity for a particular gas, such as $CO_2$ or $CH_4$. It would also be useful to provide materials which have low regeneration energy requirements. In addition, it would be advantageous to provide materials which have high storage capacities, for gases such as $H_2$, $CH_4$ and $CO_2$.

In a first aspect of the present invention there is provided a porous polymer network comprising a moiety of Formula (A)

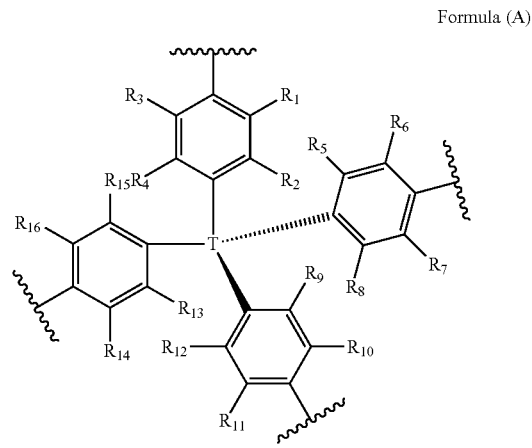

Formula (A)

wherein T is —C, —Si, —Ge, —Sn, —P, —B, —N, —$C_{10}H_{16}$ (adamantane), —$NO_2$, —CHO, —OH, —$OCH_3$ or —$OCH_2CH_3$, $R_1$ to $R_{16}$ are each independently selected from —H, —F, —Cl, —Br, —I, —OH, —$NH_2$, an alkyl, $CH_2Q$, COQ and $SO_2Q$, wherein Q is a functional group, and at least one of $R_1$ to $R_{16}$ is $CH_2Q$, COQ or $SO_2Q$, with the proviso that when at least one of $R_1$ to $R_{16}$ is COQ, Q is not $NH_2$ and that when at least one of $R_1$ to $R_{16}$ is $CH_2Q$, Q is not an alkyl group.

In an embodiment of the invention, T is selected from the group consisting of —C, —Si, —Ge and —$C_{10}H_{16}$ (adamantane).

In an embodiment of the invention, T is —Si.

In an embodiment of the invention, T is —C.

In an embodiment of the invention, the functional group is selected from an alkyl group having 1 to 6 carbon atoms, an amine and a polyamine.

In an embodiment of the invention, the functional group is —$C_3H_7$, —$C_4H_9$, —$C_5H_{11}$ or —$C_6H_{13}$.

In an embodiment of the invention, at least one of $R_1$ to $R_{16}$ is $CH_2Q$.

In an embodiment of the invention, Q is a polyamine.

In an embodiment of the invention, the polyamine is represented by the formula $N(A_1)A_2$, wherein $A_1$ and $A_2$ are each independently selected from —H, a saturated or unsaturated polyalkylamine and a saturated or unsaturated polyalkarylamine, preferably, wherein one or more amine units in the polyalkylamine or polyalkarylamine is optionally a quaternary ammonium.

In an embodiment of the invention, the polyamine is represented by $N(A_1)A_2$, wherein $A_1$ and $A_2$ are each independently selected from —H, a branched or unbranched alkyl or a branched or unbranched alkylamine having 1 to 12 carbon atoms which is optionally mono- or polysubstituted by —OH or —$NH_2$, and wherein one or more non-adjacent —$CH_2$ groups is optionally replaced, in each case independently from another by —O—, or —$N(A_3)$, wherein $A_3$ is —H, a branched or unbranched alkyl or a branched or unbranched alkylamine having 1 to 12 carbon atoms, with the proviso that at least one of $A_1$ and $A_2$ is not hydrogen.

Preferably, $N(A_1)A_2$ is selected from the group consisting of:

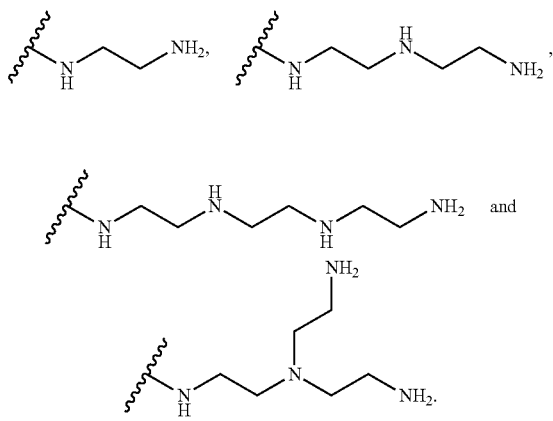

More preferably, $N(A_1)A_2$ is

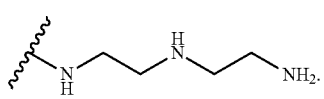 [SMILES: *NCCNCCN]

In an embodiment of the invention, the proportion of amine per gram of the porous polymer network is in the range of 1 to 1000 mmol.

In a second aspect of the invention there is provided a method of preparing a porous polymer network, comprising:

(a) a step of homo-coupling a monomer of formula 1

Formula 1

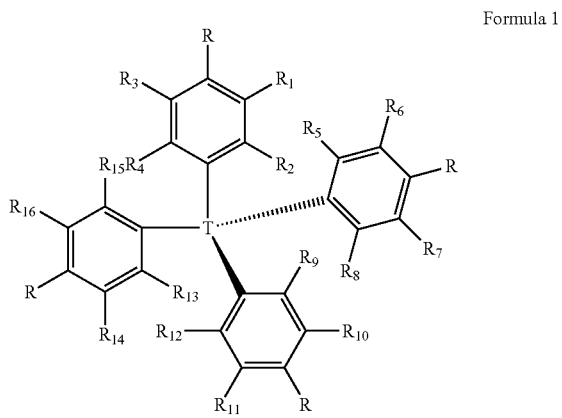

in the presence of 2,2'-bipyridyl, 1,5-cycloocta-1,5-diene, a mixed solvent of DMF/THF and a compound or mixture selected from the group consisting of bis(1,5-cycloocta-1,5-diene)nickel(0), Ni(PPH$_3$)$_4$, and Zn/NiCl$_2$/NaBr/PPH$_3$, at a temperature in the range of 20 to 40° C., wherein T is —C, —Si, —Ge, —Sn, —P, —B, —N, —$C_{10}H_{16}$ (adamantane), —$NO_2$, —CHO, —OH, —$OCH_3$ or —$OCH_2CH_3$ R is —F, —Cl, —Br, —I, an alkenyl group or an alkynyl group, $R_1$ to $R_{16}$ are each independently selected from —H, —F, —Cl, —Br, —I, —OH, —$NH_2$ and an alkyl group; and (b) a step of functionalizing the product obtained in step (a) with a compound represented by a formula selected from $CH_2Q$, $SO_2Q$ and COQ, wherein Q is a functional group, with the proviso that when the product obtained in step (a) is functionalized with $CH_2Q$, Q is not an alkyl group.

In an embodiment of the invention, T is selected from the group consisting of —C, —Si, —Ge and —$C_{10}H_{16}$ (adamantane).

In an embodiment of the invention, T is —Si.

In an embodiment of the invention, T is —C.

In an embodiment of the invention, the functional group is selected from an alkyl group having 1 to 6 carbon atoms, an amine and a polyamine.

In an embodiment of the invention, the product obtained in step (a) is functionalized with $CH_2Q$. Q may be a polyamine.

In an embodiment of the invention, the product obtained in step (a) is functionalized with a compound represented by formula $CH_2N(B_1)B_2$, $CON(B_1)B_2$ or $SO_2N(B_1)B_2$, wherein $B_1$ and $B_2$ are each independently selected from —H, a saturated or unsaturated polyalkylamine and a saturated or unsaturated polyalkarylamine, preferably, wherein one or more amine units in the polyalkylamine or polyalkarylamine is optionally a quaternary ammonium.

In an embodiment of the invention, the product obtained in step (a) is functionalized with a compound represented by formula $CH_2N(B_1)B_2$, wherein $B_1$ and $B_2$ are each independently selected from —H, a branched or unbranched alkyl or a branched or unbranched alkylamine having 1 to 12 carbon atoms which is optionally mono- or polysubstituted by —OH or —$NH_2$, and wherein one or more non-adjacent —$CH_2$ groups is optionally replaced, in each case independently from another by —O—, or —$N(A_3)$, wherein $A_3$ is —H, a branched or unbranched alkyl or a branched or unbranched alkylamine group having 1 to 12 carbon atoms, with the proviso that at least one of $B_1$ and $B_2$ is not —H.

In an embodiment of the invention, the ratio of THF:DMF used in step (a) is in the range of 1:10 to 10:1. Preferably, the ratio of THF:DMF is in the range of 1:5 to 5:1. More preferably, the ratio of THF:DMF is 1:1.

In a third aspect of the present invention, there is provided a porous polymer network obtained or obtainable by a process according to the present invention in its second aspect.

In a fourth aspect of the present invention, there is provided a method of storing a gas comprising a step of incorporating a gas into a porous polymer network according to the present invention in its first aspect or a porous polymer network according to the present invention in its third aspect. In an embodiment of the invention, the gas is $CH_4$.

In a fifth aspect of the present invention, there is provided a method of separating a gas from a gaseous mixture, comprising a step of contacting the gaseous mixture with a porous polymer network according to the present invention in its first aspect or a porous polymer network according to the present invention in its third aspect, such that a selected gas is incorporated into the porous polymer network and is thereby separated from the gaseous mixture.

In an embodiment of the present invention, the gaseous mixture comprises $CO_2$ and $N_2$. In an embodiment of the invention, the selected gas is $CO_2$.

In a sixth aspect of the invention, there is provided a porous polymer network comprising a moiety of Formula (A)

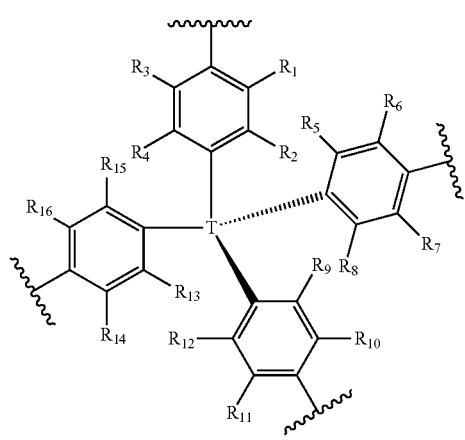

Formula (A)

wherein T is —C, —Si, —Ge, —Sn, —P, —B, —N, —$C_{10}H_{16}$, —$NO_2$, —CHO, —OH, —$OCH_3$ or —$OCH_2CH_3$, $R_1$ to $R_{16}$ are each independently selected from —H, —F, —Cl, —Br, —I, —OH, —$NH_2$ and an alkyl.

In an embodiment of the invention, T is —C, —Si, —Ge and —$C_{10}H_{16}$.

In an embodiment of the invention, T is —Si.

The PPN may have a Brunauer-Emmett-Teller (BET) surface area of 1000 $m^2/g$ to 7000 $m^2/g$. The PPN may have a Langmuir surface area of 2000 $m^2/g$ to 12,000 $m^2/g$. The PPN may have an $H_2$ gas uptake range of 2 wt % to 10 wt % at 77 K and 70 bar. The PPN may have an $N_2$ gas uptake range of 500 $cm^3/g$ to 1500 $cm^3/g$ at 77 K and 1 bar. The PPN may have a $CO_2$ gas uptake range of 50 $cm^3/g$ to 200 $cm^3/g$ at 295 K and 1 bar. In an embodiment of the invention, the PPN has a total $CH_4$ gas uptake in the range of 200 to 500 mg/g at 55 bar. In an embodiment of the invention, the PPN has a total $CH_4$ gas uptake in the range of 250 to 400 mg/g at 55 bar.

In an embodiment of the invention, each of $R_1$ to $R_{16}$ is —H.

In a seventh aspect of the invention, there is provided a method of preparing a porous polymer network, comprising:

(a) a step of homo-coupling a monomer of formula 1

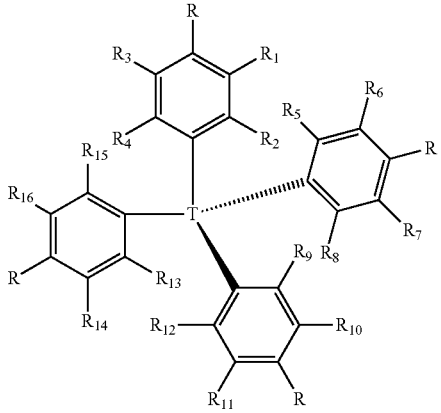

Formula 1 in the presence of 2,2'-bipyridyl, 1,5-cyclooctа-1,5-diene, a mixed solvent of DMF/THF, and a compound or mixture selected from the group consisting of bis(1,5-cyclooctа-1,5-diene)nickel(0), $Ni(PPH_3)_4$, and $Zn/NiCl_2/NaBr/PPH_3$, at a temperature in the range of 20 to 40° C., wherein T is —C, —Si, —Ge, —Sn, —P, —B, —N, —$C_{10}H_{16}$ (adamantane), —$NO_2$, —CHO, —OH, —$OCH_3$ or —$OCH_2CH_3$, R is —F, —Cl, —Br, —I, an alkenyl group or an alkynyl group, $R_1$ to $R_{16}$ are each independently selected from —H, —F, —Cl, —Br, —I, —OH, —$NH_2$ and an alkyl group.

In an embodiment of the invention, T is —Si.

In an embodiment of the invention, critical point drying is used to remove the solvent.

In an eighth aspect of the present invention, there is provided a porous polymer network obtained or obtainable by a process according to the present invention in its seventh aspect.

The porous polymer network produced according to the present invention in its seventh aspect may have a Brunauer-Emmett-Teller (BET) surface area of 1000 $m^2/g$ to 7000 $m^2/g$. The PPN may have a Langmuir surface area of 2000 $m^2/g$ to 12,000 $m^2/g$. The PPN may have an $H_2$ gas uptake range of 2 wt % to 10 wt % at 77 K and 70 bar. The PPN may have an $N_2$ has uptake range of 500 $cm^3/g$ to 1500 $cm^3/g$ at 77 K and 1 bar. The PPN may have a $CO_2$ gas uptake range of 50 $cm^3/g$ to 200 $cm^3/g$ at 295 K and 1 bar. In an embodiment, the PPN has a $CH_4$ gas uptake in the range of 200 to 500 mg/g at 55 bar. In an embodiment of the invention, the PPN has a total $CH_4$ gas uptake in the range of 250 to 400 mg/g at 55 bar.

In a ninth aspect of the invention, there is provided a method of storing a gas comprising incorporating a gas into a porous polymer network according to the present invention in its sixth aspect or a porous polymer network according to the present invention in its eighth aspect. The gas may be $CH_4$.

In a tenth aspect of the invention, there is provided a method of separating a gas from a gaseous mixture, comprising a step of contacting the gaseous mixture with a porous polymer network according to the present invention in its sixth aspect or a porous polymer network according to the present invention in its eighth aspect, such that a selected gas is incorporated into the porous polymer network and is thereby separated from the gaseous mixture. In an embodiment of the invention, the gaseous mixture comprises $CO_2$ and $N_2$. In an embodiment of the invention, the selected gas is $CO_2$.

Embodiments of the invention will now be described, by way of example only, with reference to the accompanying drawings, in which.

Figure 1:
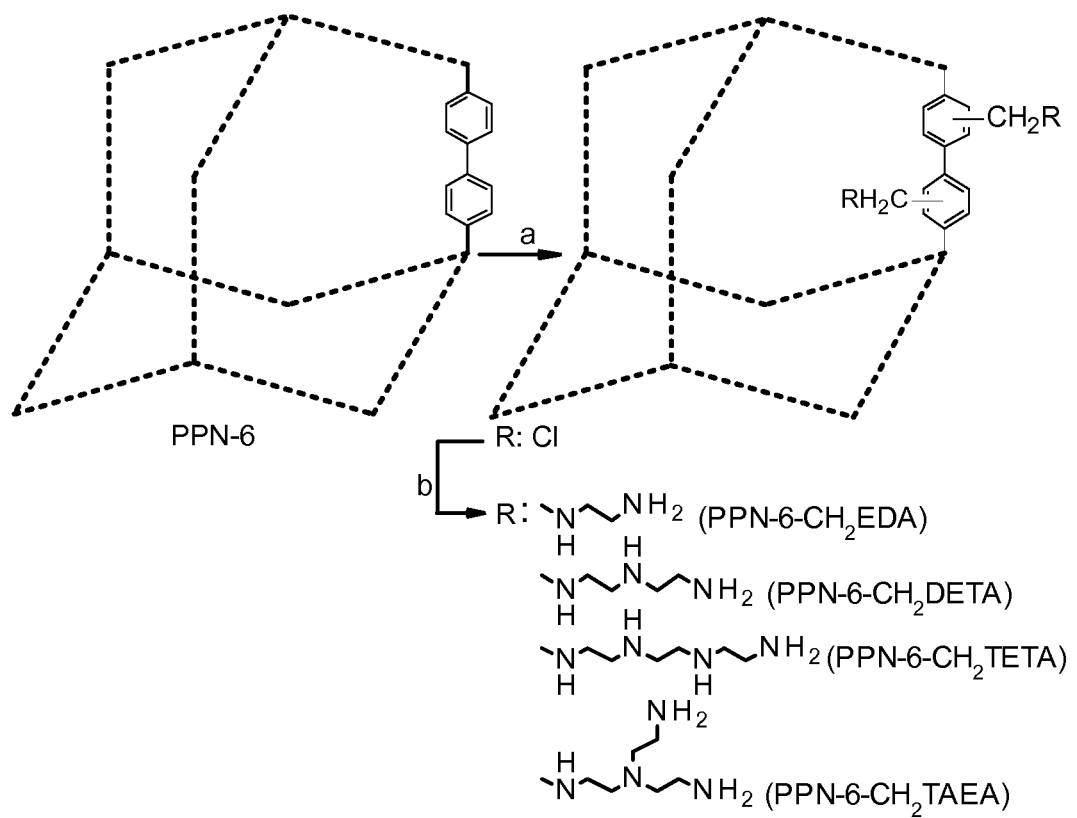
FIG. 1 illustrates a synthetic scheme for post-synthetic introduction of polyamine groups into PPN-6, according to an embodiment of the invention.

The porous polymer network according to the present invention comprises a moiety of Formula (A)

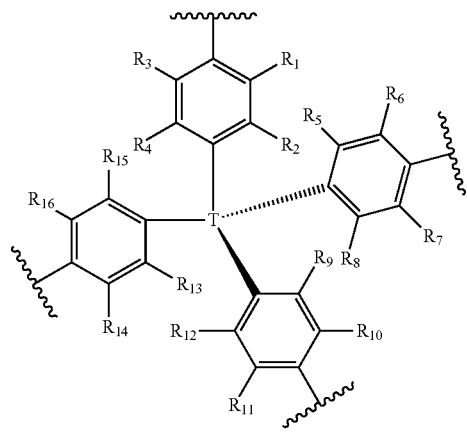

Formula (A)

wherein T is —C, —Si, —Ge, —Sn, —P, —B, —N, —$C_{10}H_{16}$ (adamantane), —$NO_2$, —CHO, —OH, —$OCH_3$ or —$OCH_2CH_3$, $R_1$ to $R_{16}$ are each independently selected from —H, —F, —Cl, —Br, —I, —OH, —$NH_2$, an alkyl, $CH_2Q$, COQ and $SO_2Q$, wherein Q is a functional group, and at least one of $R_1$ to $R_{16}$ is $CH_2Q$, COQ or $SO_2Q$, with the proviso that when at least one of $R_1$ to $R_{16}$ is COQ, Q is not $NH_2$ and that when at least one of $R_1$ to $R_{16}$ is $CH_2Q$, Q is not an alkyl group.

A porous polymer network is a porous network of covalently bonded moieties which are cross-linked to form a three-dimensional structure. A porous polymer network may be a porous network of covalently bonded moieties of formula (a). The PPNs according to the present invention typically have diamondoid structures and ultra-high surface areas that exceed those of presently known PPNs. In addition, carbon-carbon bonds interconnecting the network also serve to impart thermal and chemical stability such that post-synthetic treatments are tolerated. In some embodiments, a PPN exhibits a BET (Brunauer-Emmett-Teller) surface area in the range of 1000 $m^2/g$ to 7000 $m^2/g$ or more.

As described herein, the term 'functional group' refers to an atom or a group of atoms that has similar chemical properties whenever it occurs in different compounds. In some embodiments, the functional group is an alkyl, alkenyl, alkynyl, an amine or a polyamine.

As used herein, 'alkyl' refers to a straight-chain alkyl, a branched-chain alkyl, a cycloalkyl (alicyclic), or a cyclic alkyl. The alkyl groups may have 1, 2, 3, 4, 5, 6, 7, 8, 9, 10, 11, 12, or more carbon atoms, or any range derivable therein. In some embodiments, the alkyl group has 1-6 carbon atoms, i.e. 1, 2, 3, 4, 5, or 6 carbon atoms. The groups —$CH_3$, —$CH_2CH_3$, —$CH_2CH_2CH_3$, —$CH(CH_3)_2$, —$CH(CH_2)_2$, —$CH_2CH_2CH_2CH_3$, —$CH(CH_3)CH_2CH_3$, —$CH_2CH(CH_3)_2$, —$C(CH_3)_3$, —$CH_2C(CH_3)_3$, cyclobutyl, cyclopentyl and cyclohexyl, are all non-limiting examples of alkyl groups.

According to the present invention, the term 'amine' refers to a compound derived from ammonia by replacing one, two or three hydrogen atoms by a hydrocarbyl group. As described herein, the term 'polyamine' refers to an organic compound having two or more amine groups, wherein each amine group may be a primary amine, a secondary amine or a tertiary amine.

The present inventors have found that by tethering an amine or a polyamine to a porous polymer network of the present invention, for instance as in synthesis example 1.1.3, the PPN exhibits stronger $CO_2$ adsorption interactions than conventional PPNs and therefore has much higher $CO_2$ adsorption capacity at low pressure. In addition, it has been found that strong interactions between the surface of the PPN and $CO_2$ are formed when the PPN is tethered with an amine or polyamine. This results in high $CO_2/N_2$ adsorption selectivities under ambient conditions. Furthermore, it has been found that polyamine-tethered PPNs exhibit substantially lower regeneration energies than traditional amine scrubber solutions, in which the higher chemisorption interaction (~50 to 100 kJ/mol) necessitates heating the solutions, which contain about 70% water, to around 100° C. As detailed in the results section, polyamine-tethered PPNs are particularly advantageous as they have been found to show unprecedented $CO_2$ removal from systems of high and low concentrations of $CO_2$. In particular, polyamine-tethered PPNs show high thermal and chemical stability (higher even than for amine-tethered PPNs), especially when considering the sensitivity of the material to water and air.

In an embodiment of the invention, T is selected from the group consisting of $C_{10}H_{16}$ (adamantane) (PPN-3), Si (PPN-4), Ge (PPN-5) and C (PPN-6). Preferably, T is Si. PPN-4 exhibits superior stability, when compared with conventional porous materials, and therefore it is a very promising candidate for gas storage applications. The exceptionally high storage capacities of PPN-4 combined with excellent stability make PPN-4 a very attractive candidate for gas storage applications, particularly for the storage of $H_2$, $CH_4$ and $CO_2$.

In an embodiment of the invention, T is C. Purely organic porous polymer networks are advantageous as they exhibit surface area comparable to conventional MOFs (metal-organic frameworks), but have much higher physicochemical stability due to the entirely covalently bonded network.

In an embodiment of the invention, the functional group is selected from an alkyl group having 1 to 6 carbon atoms, an amine and a polyamine. The functional group may be $-C_3H_7$, $-C_4H_9$, $-C_5H_{11}$ or $-C_6H_{13}$.

In an embodiment of the invention, the at least one of $R_1$ to $R_{16}$ is $CH_2Q$.

In an embodiment of the invention, Q is a polyamine.

In an embodiment of the invention, the polyamine is represented by $N(A_1)A_2$, wherein $A_1$ and $A_2$ are each independently selected from —H, a saturated or unsaturated polyalkylamine and a saturated or unsaturated polyalkarylamine.

The polyalkarylamine may be

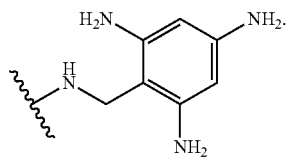 [SMILES: *NCc1c(N)cc(N)cc1N]

In an embodiment of the invention, one or more amine units in the polyalkylamine or polyalkarylamine is a quaternary ammonium.

In an embodiment of the invention, the polyamine is represented by $N(A_1)A_2$, wherein $A_1$ and $A_2$ are each independently selected from —H, a branched or unbranched alkyl or a branched or unbranched alkylamine having 1 to 12 carbon atoms which is optionally mono- or polysubstituted by —OH or $-NH_2$, and wherein one or more non-adjacent $-CH_2$ groups is optionally replaced, in each case independently from another by —O—, or $-N(A_3)$, wherein $A_3$ is —H, a branched or unbranched alkyl or a branched or unbranched alkylamine having 1 to 12 carbon atoms, with the proviso that at least one of $A_1$ and $A_2$ is not hydrogen.

Preferably, $N(A_1)A_2$ is selected from the group consisting of:

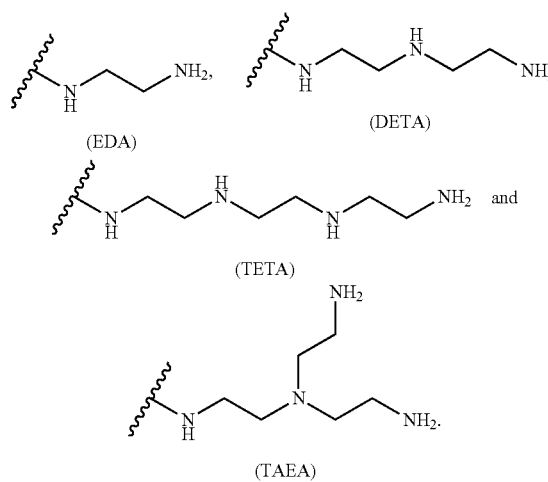

More preferably, $N(A_1)A_2$ is

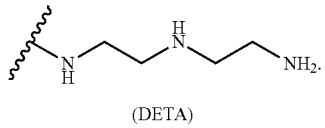 [SMILES: *NCCNCCN]

(DETA)

The adsorption selectivity of $CO_2$ over other gases, such as $N_2$, has been evaluated for polyamine-tethered PPN-6 (wherein T in Formula (A) is C). As explained in detail below, the present inventors found that polyamine-tethered PPN-6 strongly interacts with $CO_2$ over a wide range of pressures and temperatures.

In an embodiment of the invention, the proportion of amine per gram of the porous polymer network is in the range of 1 to 1000 mmol. The proportion of amine per gram of the porous polymer network may be in the range of 1 to 200 mmol/g. Preferably, the proportion of amine per gram of the porous polymer network is in the range of 1 to 10 mmol/g.

The method for preparing a porous polymer network according to the present invention comprises:

(a) a step of homo-coupling a monomer of formula 1

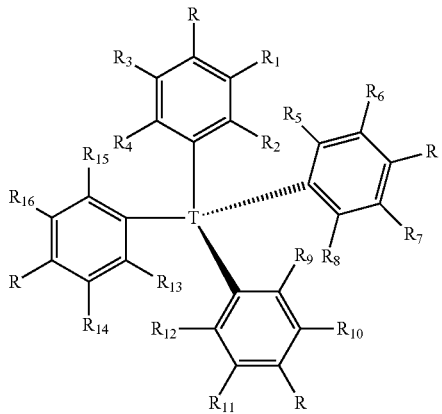

Formula 1 in the presence of 2,2'-bipyridyl, 1,5-cycloocta-1,5-diene, a mixed solvent of DMF/THF and a compound or mixture selected from the group consisting of bis(1,5-cycloocta-1,5-diene)nickel(0), $Ni(PPH_3)_4$ and $Zn/NiCl_2/NaBr/PPH_3$, at a temperature in the range of 20 to 40° C., wherein T is C, Si, Ge, Sn, P, B, N, $C_{10}H_{16}$ (adamantane), $NO_2$, CHO, OH, $OCH_3$ or $OCH_2CH_3$, R is —F, —Cl, —Br, —I, an alkenyl group or an alkynyl group, $R_1$ to $R_{16}$ are each independently selected from —H, —F, —Cl, —Br, —I, —OH, $-NH_2$ and an alkyl group; and (b) a step of functionalizing the product obtained in step (a) with a compound selected from $CH_2Q$, $SO_2Q$ and COQ, wherein Q is a functional group, with the proviso that when the product obtained in step (a) is functionalized with COQ, Q is not $NH_2$ and that when the product obtained in step (a) is functionalized with $CH_2Q$, Q is not an alkyl group.

As described herein, the term 'alkenyl' may include straight-chain alkenyl, branched-chain alkenyl, cycloalkenyl and cyclic alkenyl. Alkenyl groups may comprise 1, 2, 3, 4, 5, 6, 7, 8, 9, 10, 11, 12, or more carbon atoms, or any range derivable therein. For example, the alkenyl group may have 1 to 6 carbon atoms. In particular, the alkenyl group may be $-CH_2=CH_2$, $-CH=CHCH_3$, $-CH=CHCH_2CH_3$, $-CH_2CH=CH_2$ or $-H_2CH=CHCH_3$.

As described herein, the term 'alkynyl' may include straight-chain alkynyl, branched-chain alkynyl, cycloalkynyl, and cyclic alkynyl. Alkynyl groups may comprise 1, 2, 3, 4, 5, 6, 7, 8, 9, 10, 11, 12, or more carbon atoms, or nay range derivable therein. For example, the alkynyl group may have 1 to 6 carbon atoms. In particular, the alkynyl groups may be —C≡CH or —C≡CCH$_3$.

The monomer of formula 1 is homocoupled under modified Yamamoto coupling conditions. Yamamoto coupling conditions are known in the art and refer to coupling of terminal halogens using bis(1,5-cyclooctagiene)nickel(0), DMF, 2,2'-bipyridyl, and 1,5-cyclooctadiene in the presence of elevated temperatures (e.g., 80 C). See, e.g., Holst et al., Macromolecules 43:8531 (201); Schmidt et al., Macromolecules, 42:4426 (2009); and Ben et al., Angew. Chemie Int. Ed. 48:9457 (2009). Modified Yamamoto coupling conditions refer to Yamamoto coupling conditions as described above but that take place in a mixture of DMF and THF at room temperature.

Preparation of the PPNs using the optimized Yamamoto coupling conditions described herein, helps eliminate unreacted termini of the monomer starting materials and facilitates formation of highly connected frameworks.

In an embodiment of the present invention, the monomer of formula 1 is homo-coupled in the presence of 2,2'-bipyridyl, 1,5-cycloocta-1,5-diene, a mixed solvent of DMF/THF and bis(1,5-cycloocta-1,5-diene)nickel(0), at a temperature in the range of 20 to 40° C.

The inventors have found that the modified Yamamoto coupling conditions discussed above result in a PPN with significantly higher BET surface area than the surface area of a PPN produced using conventional coupling conditions, such as standard Yamamoto coupling conditions. In particular, the inventors have found that PPNs prepared using the modified coupling conditions may have one or more characteristics as follows. The PPNs may have a Brunauer-Emmett-Teller (BET) surface area of about moo m$^2$/g to about 7000 m$^2$/g. The PPNs may have a Langmuir surface area of about 2000 m$^2$/g to about 12,000 m$^2$/g. The PPNs may have an H$_2$ gas uptake range of about 2 wt % to about 10 wt % at about 77 K and about 70 bar. The PPNs may have an N$_2$ gas uptake range of about 500 cm$^3$/g to about 2500 cm$^3$/g at about 77 K and about 1 bar and the PPNs may have a CO$_2$ gas uptake range of about 50 cm$^3$/g to about 200 cm$^3$/g at about 295 K and about 1 bar.

The PPNs typically feature surface areas or gas uptakes that exceed those of presently known PPNs. In some embodiments, a PPN exhibits a BET surface area in the range of moo to 8000 m$^2$/g, or a BET surface area of, at least, or at most 1000, 1250, 1750, 2000, 2250, 2500, 2750, 3000, 3250, 3500, 3750, 4000, 4250, 4500, 4750, 5000, 5350, 5500, 5750, 6000, 6100, 6200, 6250, 6300, 6400, 6500, 6600, 6700, 6750, 6800, 6900, 7000, 7100, 7200, 7250, 7300, 7400, 7500, 7600, 7700, 7750, 7800, 7900, or 8000 m$^2$/g, or more, or any range derivable therein. In some embodiments, a PPN exhibits a Langmuir surface area in the range of 45000 m$^2$/g to 13000 m$^2$/g, or a Langmuir surface area of, at least, or at most 2000, 2250, 2500, 2750, 3000, 3250, 3500, 3750, 4000, 4250, 4500, 4750, 5000, 5250, 5500, 5750, 6000, 6100, 6200, 6250, 6300, 6400, 6500, 6600, 6700, 6750, 7000, 7250, 7750, 8000, 8250, 8500, 9000, 9250, 9500, 9750, 10000, 10250, 10500, 10750, 11000, 11250, 11500, 11750, 12000, 12250, 12500, 12750, or 13000 m$^2$/g, or more, or any range derivable therein. In some embodiments, H$_2$ uptake is in the range of 4 to 10 wt %, or the H$_2$ uptake is at least, or at most 2, 3, 4, 5, 6, 7, 8, 9, 10, 11, 12, 13, 14, or 15% or more, or any range derivable therein, at about 77 K and about 70 bar. In some embodiments, N$_2$ uptake is in the range of 500-3500 cm$^3$/g or the N$_2$ uptake is at least, or at most 500, 750, 1000, 1250, 1500, 1750, 2000, 2250, 2500, 3000 or 3500 cm$^3$/g, or any range derivable therein, at about 77 K and about 1 bar. In some embodiments, CO$_2$ uptake is in the range of 100 to 200 cm$^3$/g or the CO$_2$ uptake is at least, or at most 50, 75, 100, 125, 150, 175 or 200 cm$^3$/g or more, or any range derivable therein, at about 295 K and about 1 bar. One or more of each of these properties may be exhibited by a single PPN.

In an embodiment of the invention, the ratio of DMF:THF is in the range of 1:10 to 10:1. Preferably, the ratio of DMF:THF is in the range of 1:5 to 5:1. More preferably, the ratio of DMF:THF is 1:1. It has been determined that the ratio of DMF:THF has a beneficial effect on the BET surface area of the resulting PPN, as demonstrated in the results section below.

In an embodiment of the invention, T is selected from the group consisting of C, Si, Ge and C$_{10}$H$_{16}$ (adamantane). Preferably, T is C. In an embodiment of the invention, T is Si.

In an embodiment of the invention, the functional group is selected from an alkyl group having 1 to 6 carbon atoms, an amine and a polyamine.

In an embodiment of the invention, the product obtained in step (a) is functionalized with CH$_2$Q. Q may be a polyamine.

In an embodiment of the invention, the product obtained in step (a) is functionalized with a polyamine group. As detailed in the results section, polyamine-tethered PPNs, which can be produced according to the method described above, are particularly advantageous as they have been found to show unprecedented CO$_2$ removal from systems of high and low concentrations of CO$_2$ The inventors have found that polyamine-tethered PPNs have extremely high CO$_2$ capacity at very low pressures because of the multiple adsorption sites, which is desired for CO$_2$ capture from flue gas or air. In addition, polyamine-tethered PPNs show high thermal and chemical stability (higher even than for amine-tethered PPNs), especially when considering the sensitivity of the material to water and air.

According to an embodiment of the present invention the PPN is functionalized with a polyamine group. The polyamine may be represented by formula N(B$_1$)B$_2$, wherein B$_1$ and B$_2$ are each independently selected from —H, a saturated or unsaturated polyalkylamine, a saturated or unsaturated polyarylamine and a saturated or unsaturated polyalkarylamine.

The polyalkarylamine may be

In an embodiment of the second aspect of the invention, the polyamine is represented by formula N(B$_1$)B$_2$, wherein B$_1$ and B$_2$ are each independently selected from —H, a branched or unbranched alkyl or a branched or unbranched alkylamine having 1 to 12 carbon atoms which is optionally mono- or polysubstituted by —OH or —NH$_2$, and wherein one or more non-adjacent —CH$_2$ groups is optionally replaced, in each case independently from another by —O—, or —N(A$_3$), wherein A$_3$ is —H, a branched or unbranched alkyl or a branched or unbranched alkylamine having 1 to 12 carbon atoms, with the proviso that at least one of B$_1$ and B$_2$ is not hydrogen.

Preferably, the polyamine is selected from

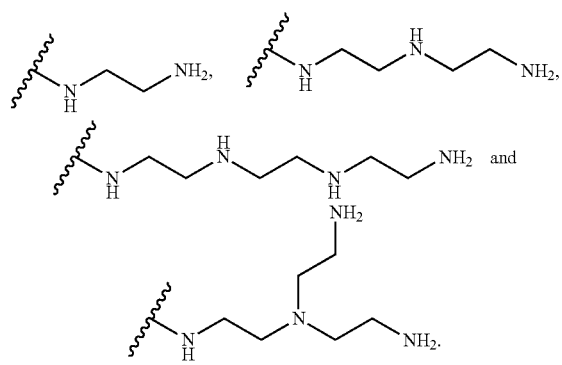

More preferably, the polyamine is

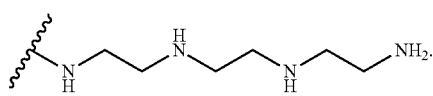 [SMILES: *NCCNCCNCCN]

In the present invention, the functional group or amine or polyamine is attached to the PPN via a linker molecule. The linker molecule may be CO, $CH_2$ or $SO_2$. The PPN may be functionalized by a two or more step process. The first step may involve introducing a linker molecule into the PPN and the second step may involve reacting the product of the first step with a functional group or an amine or polyamine. In an embodiment of the invention, the PPN is functionalised by a first step in which a —CHO group, a compound of formula $CH_2X$, a compound of formula COX, or a compound of formula $SO_2X$ is introduced into the PPN, wherein X is selected from —Cl, F, Br and —I and a second step in which the product of the first step is reacted with a functional group or an amine or polyamine.

In an embodiment of the invention, the product of the first step is reacted with a polyamine.

In an embodiment of the invention, the polyamine is selected from

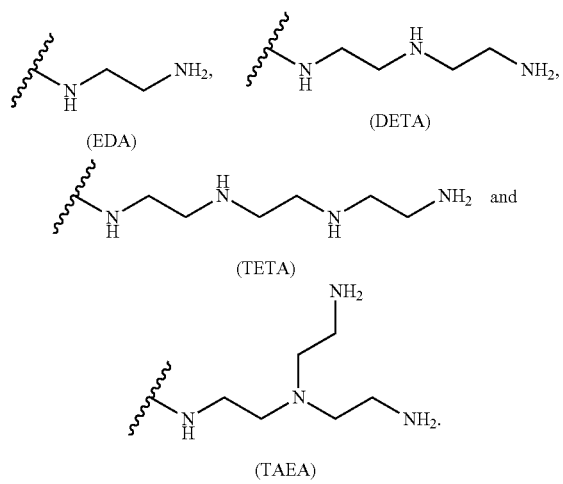

An aspect of the present invention, there is provided a porous polymer network obtained or obtainable by a process according to the present invention in its second aspect.

PPNs as disclosed herein may be used, for example, in the context of carbon capture, gas storage and separation (e.g. separation of a mixture of gases), or supports for catalysts or other chemicals. Other uses include liquid sorption, size-selective separation of nanoparticles, immobilization of nanoparticles, preparation of a sensor device, controlled release of a substance from the network, and as an electrically conducting component in a device. An aspect of the present invention provides a method of storing a gas comprising incorporating a gas into a porous polymer network as described herein. The gas incorporated into the porous polymer network may be $CH_4$. In an embodiment of the invention, a gas of choice may be selectively stored in comparison to a second gas. The gas of choice may be $CO_2$. The second gas may be $N_2$.

An aspect of the invention provides a method of separating a gas from a gaseous mixture, comprising a step of contacting the gaseous mixture with a porous polymer network as described herein, such that a selected gas is incorporated into the porous polymer network and is thereby separated from the gaseous mixture. The gaseous mixture may comprise $CO_2$ and $N_2$. The selected gas may be $CO_2$.

The invention will now be described by way of illustration only on the following examples.

1. Preparation of PPNs

SYNTHESIS EXAMPLE 1.1

Preparation of PPN-6

All reagents and chemicals were purchased from Aldrich, Alfa, and Acros. N,N-Dimethylformamide (DMF) and Tetrahydrofuran (THF) were degassed before use. Tetrakis(4-bromophenyl)methane was synthesized as described in Chem. Mater., 2010, 22, 5964-5972.

To a solution of 2,2'-bipyridyl (226 mg, 1.45 mmol), bis(1, 5-cyclooctadiene)nickel(0) ($Ni(COD)_2$, 400 mg, 1.45 mmol), and 1,5-cyclooctadiene (COD, 0.18 mL, 1.46 mmol) in anhydrous DMF/THF (30 mL/30 mL), tetrakis(4-bromophenyl)methane (205 mg, 0.32 mmol) was added, and the mixture was stirred at 25° C. under an argon gas atmosphere for 10 hours. Then, the mixture was cooled in an ice bath, 6 mol/L HCl solution (20 mL) was added and the resulting mixture was stirred for another 6 hours. The precipitate was collected, washed with methanol (6×10 mL) and $H_2O$ (6×10 mL), respectively, and dried in vacuo at 120° C. for 10 hours to produce PPN-6 as an off-white powder (85 mg, 85%).

Elemental analysis calc. (%) for $C_{25}H_{16}$: C 94.94; H 5.06. found: C 93.51; H 5.25; Solid-state $^{13}$C NMR (4 mm, Bybass, 10 KHz, Field=−2000, p15=2000): 142.6, 136.2, 127.8, 122.0.

SYNTHESIS EXAMPLE 1.2

Preparation of PPN-3

PPN-3 was synthesised in the same manner as PPN-6 of synthesis example 1.1, except that tetrakis(4-bromophenyl) adamantane was used instead of tetrakis(4-bromophenyl) methane.

Elemental analysis calc. (%): C 96.54; H 6.46; N 0.0; Br 0.0. found: C 90.44; H 6.57; N 0.11; Br 0.00.

SYNTHESIS EXAMPLE 1.3

Preparation of PPN-4

PPN-4 was synthesised in the same manner as PPN-6 of synthesis example 1.1, except that tetrakis(4-bromophenyl) silane was used instead of tetrakis(4-bromophenyl)methane.

Elemental analysis calc. (%): C 86.70; H 4.85. found: C 84.35; H 4.93.

SYNTHESIS EXAMPLE 1.4

Preparation of PPN-5

PPN-5 was synthesised in the same manner as PPN-6 of synthesis example 1.1, except that tetrakis(4-bromophenyl)germane was used instead of tetrakis(4-bromophenyl)methane.

Elemental analysis calc. (%): C 76.46; H 4.28; N 0.0: Br 0.0. found: C 75.12; H 4.42; N 0.14; Br 0.0.

COMPARATIVE SYNTHESIS EXAMPLE 1.1

Preparation of PAF-1

PAF-1 was synthesized using Yamamoto coupling conditions, as described in Ben et al., Angew. Chemie. Int. Ed. 48:9457 (2009).

1.1 Evaluation of the Surface Area for PPNs 3-5

The surface area was evaluated for each of PPNs 3 to 5 prepared using the modified Yamamoto homo-coupling procedure. The results are shown in Table 1 below.

TABLE 1:

Evaluation of the surface area for PPNs 3-5

| Material | $A_{BET}$ (m²/g) | $A_{Lang}$ (m²/g) | $A_{Calc}$* (m²/g) | $V_p$ (cm³/g) |
|---|---|---|---|---|
| PPN-3 | 4221 | 5263 | 6940 | 2.67 |
| PPN-4 | 6461 | 10063 | 6530 | 3.04 |
| PPN-5 | 4267 | 6764 | 5881 | 2.60 |
| PAF-1 | 5600 | 7100 | 6173 | 3.05 |

*The accessible surface area was calculated from a simple Monte Carlo integration technique where the probe molecule is 'rolled' over the framework surface (Frost et al., J. Phys. Chem. B 110: 9565 (2006).

The results show that PPN-3, PPN-4, and PPN-5 can be synthesized with exceptionally high surface areas using the modified Yamamoto coupling procedure.

The surface area of PPN-3, synthesized through this procedure is much higher than the value previously reported, and the surface area of PPN-4 is close to the value predicted based on the molecular model, indicating the excellence of this optimized procedure. With a BET surface area of 6461 m²/g and a Langmuir surface area of 10063 m²/g, PPN-4 appears to possess the highest surface area among all the reported porous materials so far making it a strong candidate for potential applications in gas separation and storage. In addition, most of the pores in PPN-4 are in the microporous or microporous/mesoporous region of the PPN, which is beneficial for gas storage applications.

SYNTHESIS EXAMPLE 1.1.1

Evaluating the Effect the Ratio of DMF:THF Used in Synthesis Example 1.1 has on the BET Surface Area of the Resulting PPN PPN-6 was prepared in the same manner as in the method of Synthesis Example 1.1, except that the amount of DMF/THF was varied within the range of 40 mL/20 mL to 20 mL/40 mL. The BET surface area of the resulting PPN-6 materials was then measured.

The results are shown in Table 2 below. For comparison the BET surface area of PAF-1 is also shown in Table 2.

TABLE 2

A comparison of the BET surface area for PPN-6 when the ratio of DMF:THF used in synthesis example 1.1 is altered.

| Reaction condition | BET surface area (m²/g) of PPN-6 |
|---|---|
| DMF (30 mL), 80° C., 1 h (PAF-1 condition) | 3200 |
| DMF/THF (40 mL/20 mL), 25° C., 10 h | 3300 |
| DMF/THF (20 mL/40 mL), 25° C., 10 h | 3600 |
| DMF/THF (36 mL/24 mL), 25° C., 10 h | 3800 |
| DMF/THF (24 mL/36 mL), 25° C., 10 h | 3600 |
| DMF/THF (30 mL/30 mL), 25° C., 10 h | 4100 |

It is clear from Table 2 that the BET surface area of a PPN is affected by altering the ratio of DMF to THF used in its synthesis.

2. Gas Sorption Measurements for PPN-4

2.1 Low-Pressure Gas Sorption Measurements

Low pressure (<800 torr) gas sorption isotherms were measured using a Micrometrics ASAP 2020 surface area and pore size analyzer. Prior to the measurements, the samples were degassed for 10 h at 80° C. UHP grade gases were used for all measurements. Oil-free vacuum pumps and oil-free pressure regulators were used for all measurements to prevent contamination of the samples during the degassing process and isotherm measurement.

2.2. High-Pressure Gas Sorption Measurements

High pressure excess adsorption of $H_2$, $CH_4$ and $CO_2$ were measured using an automated controlled Sieverts' apparatus (PCT-Pro 2000 from Setaram) at 77 K (liquid nitrogen bath) or 295 K (room temperature). About 200 mg of PPN-4 was loaded into the sample holder. Prior to the measurements, sample was degassed at 80° C. overnight. The free volume was determined by the expansion of low-pressure He (<5 bar) at room temperature. The temperature gradient between gas reservoir and sample holder was corrected by applying a correction factor to the raw data, which was obtained by replacing the sample with a polished stainless steel rod and measuring the adsorption isotherm at the same temperature over the requisite pressure regime.

To evaluate its gas storage capacity, high-pressure excess adsorption of $H_2$, $CH_4$ and $CO_2$ within PPN-4 were measured at 77 K or 295 K. The results are shown in Table 3 below.

TABLE 3

A comparison of $H_2$, $CO_2$ and $CH_4$ uptake values for $PPN_{-4}$ and $PAF_{-1}$.

| Material | Excess $H_2$ uptake (mg g⁻¹) | Total $H_2$ uptake (mg g⁻¹) | Excess $CO_2$ uptake (mg g⁻¹) | Total $CO_2$ uptake (mg g⁻¹) | Excess $CH_4$ uptake (mg g⁻¹) | Total $CH_4$ uptake (mg g⁻¹) |
|---|---|---|---|---|---|---|
| $PPN_{-4}$ | 91 (55 bar) | 158 (80 bar) | 1710 (50 bar) | 2121 (55 bar) | 269 (55 bar) | 389 (55 bar) |
| $PAF_{-1}$ | 75.3 (48 bar) | 120 (48 bar) | 1300 (40 bar) | 1585 (40 bar) | | |

An exceptionally high surface area combined with excellent stability make PPN-4 an attractive candidate for gas storage applications, particularly for the storage of gas molecules such as $H_2$, $CH_4$ and $CO_2$.

3. Amine Tethering

SYNTHESIS EXAMPLE 3.1

Preparation of PPN-6-$CH_2Cl$

A resealable flask was charged with PPN-6 (200 mg), paraformaldehyde (1.0 g), glacial AcOH (6.0 mL), $H_3PO_4$ (3.0 mL), and conc. HCl (20 mL). The flask was sealed and heated to 90° C. for 3 days. The resulting solid was collected, washed with water and methanol, and then dried in vacuo to produce PPN-6-CH$_2$Cl as a brown powder in quantitative yield.

SYNTHESIS EXAMPLE 3.2

Preparation of a Polyamine-Tethered PPN (with the Synthesis of PPN-6-CH$_2$DETA as an Example)

A resealable flask was charged with PPN-6-CH$_2$Cl (200 mg) and diethylenetriamine (DETA, 20 mL). The flask was sealed and heated to 90° C. for 3 days. The resulting solid was collected, washed with water and methanol, and then dried in vacuo to produce PPN-6-CH$_2$DETA as a brown powder in quantitative yield.

FIG. 1 shows a scheme for introducing a polyamine group into PPN-6, such as in Synthesis Example 1.1.3.

3.1 Evaluation of the Efficiency of the Polyamine Tethering

The efficiency of the amine substitution was confirmed by elemental analysis. For each amine-tethered PPN (PPN-6-CH$_2$EDA, PPN-6-CH$_2$TAEA, PPN-6-CH$_2$TETA, PPN-6-CH$_2$DETA), the compound was dried at 100° C. under vacuum for 10 hours before elemental analysis measurements were taken.

Results of the elemental analysis are shown in Table 4 below. For comparison, elemental analysis was also performed on PPN-6-CH$_2$Cl, the results of which are also shown in Table 4.

TABLE 4

Elemental analysis performed on polyamine-tethered PPNs and PPN-6-CH$_2$Cl

| | PPN-6-CH$_2$Cl | PPN-6-CH$_2$EDA | PPN-6-CH$_2$TAEA | PPN-6-CH$_2$TETA | PPN-6-CH$_2$DETA |
|---|---|---|---|---|---|
| Cl %* | 14.42 | 0.33 | <0.25 | <0.25 | <0.25 |
| N %* | 0.0 | 7.53 | 9.31 | 9.04 | 11.95 |

*Average of 2 measurements

From this data it is evident that the chlorine content of 14.42% in PPN-6-CH$_2$Cl was reduced to only trace amounts in the polyamine-tethered PPNs. In addition, these data illustrate that PPN-6-CH$_2$DETA had the highest nitrogen content of 11.95%, corresponding to a loading of 0.3 functional groups per phenyl ring.

4. Pore Size Evaluation

Pore size distribution data for PPN-6-CH$_2$Cl and PPN-6-CH$_2$-DETA were calculated from the N$_2$ sorption isotherms based on the DFT model in the Micromeritics ASAP 2020 software package (assuming slit pore geometry).

Figure 2:
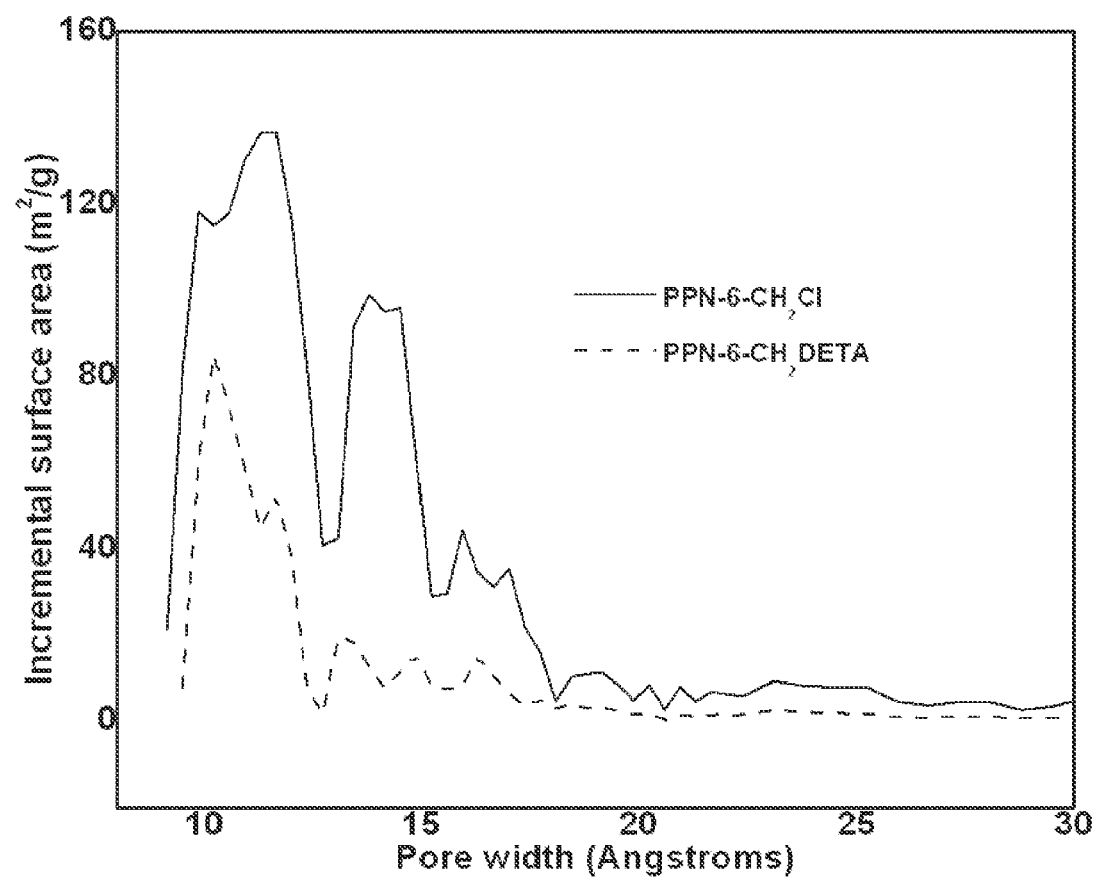
FIG. 2 illustrates pore size distribution curves of PPN-6-$CH_2Cl$ and PPN-6-$CH_2DETA$ (DETA=diethylenetriamine), according to an embodiment of the invention.

A comparison of the pore size distribution curves for PPN-6-CH$_2$Cl and PPN-6-CH$_2$DETA is shown in FIG. 2.

As illustrated in FIG. 2, the pore sizes of PPN-6-CH$_2$DETA have narrowed after amine tethering, which supports that the amination reaction occurred within the cavities of PPN-6.

5. Creation of PPN Models

The theoretical non-interpenetrated networks of the PPNs described herein were created by repeating the unit of the monomer molecule and their geometrical structures were optimized using the Forcite Plus module and the Universal force field in Material Studio 5.5 from Accelrys (Accelrys, Materials Studio Release Notes, Release 5.5, Accelrys Software, Inc.: San Diego, 2010).

6. Evaluation of the Nitrogen Adsorption Characteristics of Amine-Tethered PPNs

Nitrogen gas adsorption/desorption isotherms were collected at 77 K for PPN-6-CH$_2$—Cl, PPN-6-CH$_2$EDA, PPN-6-CH$_2$TAEA, PPN-6-CH$_2$TETA and PPN-6-CH$_2$DETA. The results are shown in FIG. 3.

Figure 3:
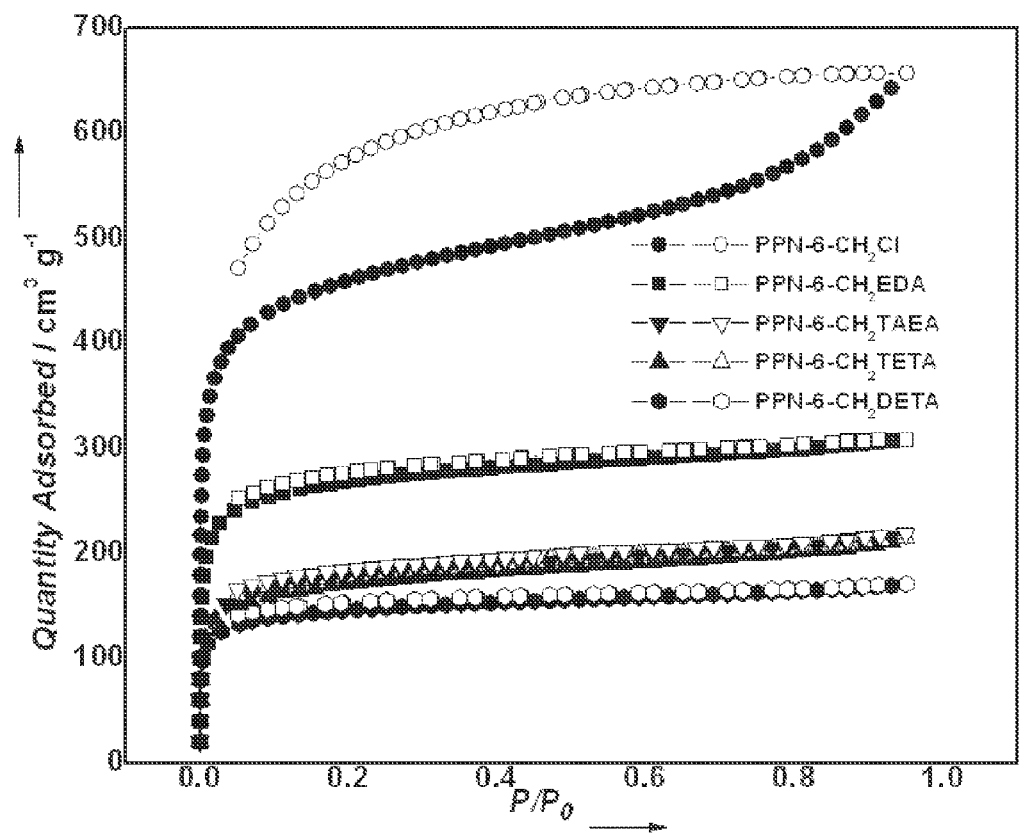
FIG. 3 shows a $N_2$ sorption isotherm collected at 77 K for materials PPN-6-$CH_2Cl$, PPN-6-$CH_2DETA$, PPN-6-$CH_2TAEA$ (TAEA=tris(2-aminoethyl)amine), PPN-6-$CH_2TETA$ (TETA=triethylenetetramine), PPN-6-$CH_2EDA$ (EDA=ethylenediamine), according to an embodiment of the invention.

It is evident from FIG. 3 that amine-tethered PPNs adsorb less N$_2$ at 77K than PPN-6-CH$_2$Cl.

Nitrogen gas adsorption/desorption isotherms were also collected at 295 K for PPN-6-CH$_2$—Cl, PPN-6-CH$_2$EDA and PPN-6-CH$_2$DETA. The results are shown in FIG. 4.

Figure 4:
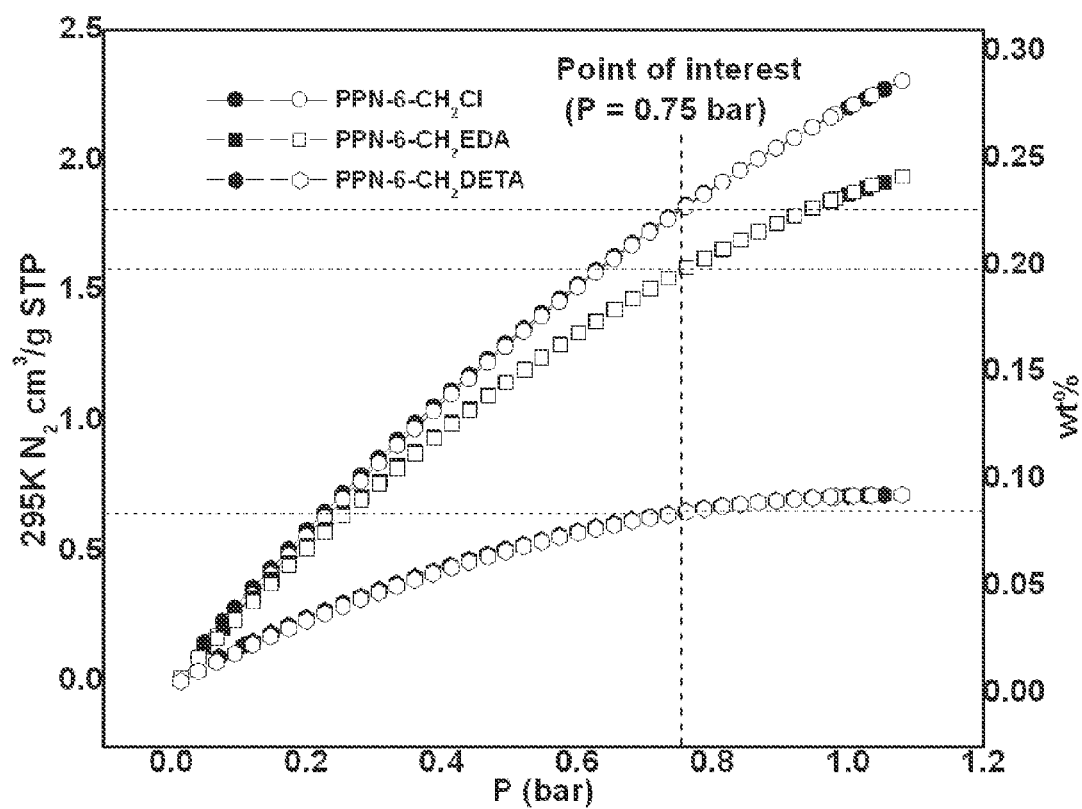
FIG. 4 shows a $N_2$ sorption isotherm collected at 295 K for materials PPN-6-$CH_2Cl$, PPN-6-$CH_2EDA$ and PPN-6-$CH_2DETA$, according to an embodiment of the invention.

As illustrated in FIG. 4, at 295 K, polyamine-tethered PPNs adsorb less N$_2$ than PPN-6-CH$_2$Cl. PPN-6-CH$_2$DETA is especially interesting with an uptake of less than 0.1 wt % N$_2$ at 1.0 bar, one third of that of PPN-6-CH$_2$Cl. It is possible that the added polar sites may enhance N$_2$ adsorption, but this is totally offset by the significant loss in surface area.

7. Evaluation of the CO$_2$ Adsorption Characteristics of Amine-Tethered PPNs

CO$_2$ sorption isotherms were collected at 295 K for PPN-6-CH$_2$—Cl, PPN-6-CH$_2$EDA, PPN-6-CH$_2$TAEA, PPN-6-CH$_2$TETA and PPN-6-CH$_2$DETA. The results are shown in FIG. 5.

Figure 5:
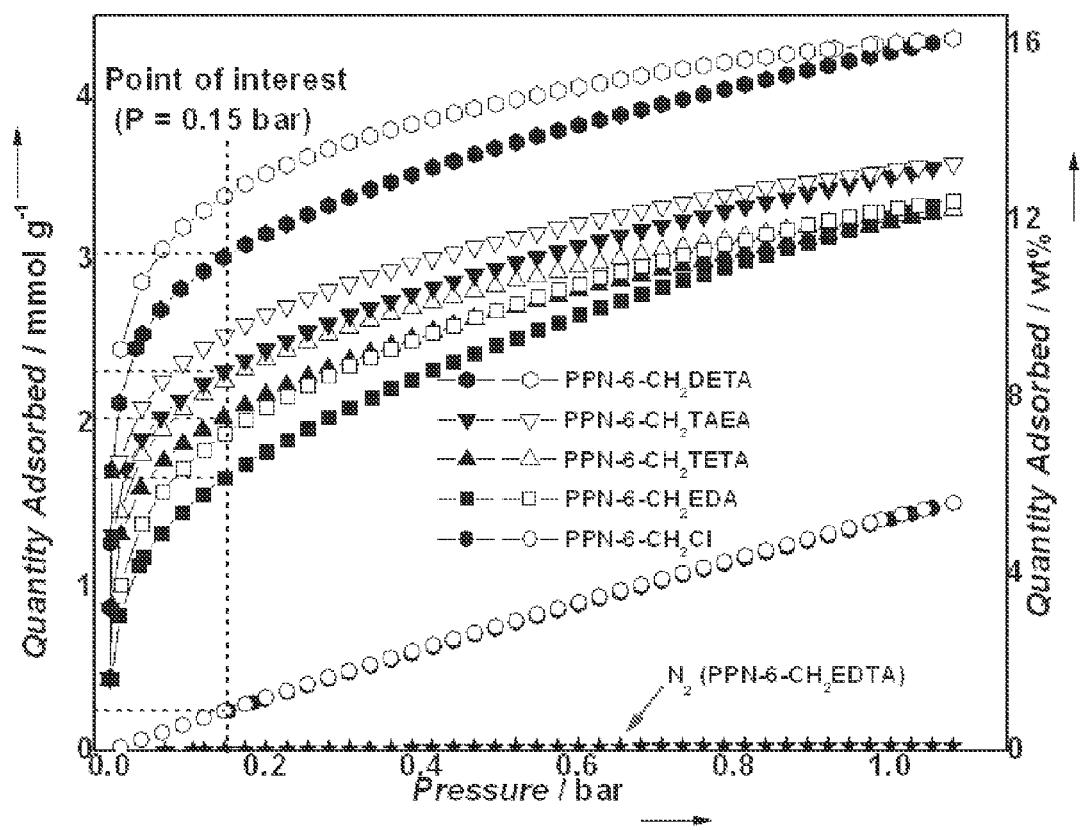
FIG. 5 shows a $CO_2$ sorption isotherm collected at 295 K for materials PPN-6-$CH_2Cl$, PPN-6-$CH_2DETA$, PPN-6-$CH_2TAEA$, PPN-6-$CH_2TETA$ and PPN-6-$CH_2EDA$, according to an embodiment of the invention.

It is evident from FIG. 5 that polyamine-tethered PPN-6 shows excellent CO$_2$ adsorption characteristics at 295 K and at low pressures. Furthermore, FIG. 5 shows that although PPN-6-CH$_2$DETA has the lowest surface area, it exhibits the highest CO$_2$ uptake capacity among all of the polyamine-tethered PPNs. This indicates that the CO$_2$-uptake capacity is closely correlated to amine loading instead of surface area under these conditions. For example, at 295 K and 1 bar, PPN-6-CH$_2$DETA exhibits exceptionally high CO$_2$ uptake (4.3 mmol g$^{-1}$, 15.8 wt %). This value is higher than top-performing N-containing microporous organic polymers such as N-TC-EMC (4.0 mmol g$^{-1}$), BILP-4 (3.6 mmol g$^{-1}$) and MFB-600 (2.25 mmol g$^{-1}$.

Coal fired power plants emit flue gas that contains ~15% CO$_2$ at total pressures around 1 bar, thus CO$_2$-uptake capacity at ca. 0.15 bar (partial pressure of CO$_2$ in flue gas) is more relevant to realistic post-combustion applications. At 295 K and 0.15 bar, PPN-6-CH$_2$Cl only takes up 0.25 mmol g$^{-1}$ (1.1 wt %), whereas PPN-6-CH$_2$DETA takes up 3.0 mmol g$^{-1}$ of CO$_2$ (11.8 wt %). This value is comparable to other top-performing materials, such as mmen-CuBTTri (9.5 wt % at 298 K), and MgMOF-74 (22.0 wt % at 293 K), while PPN-CH$_2$DETA stands out with respect to physiocochemical stability due to the covalent bonding in framework construction. The surge in volumetric uptake capacity with polyamine-tethering is even more significant from 1.3 g L$^{-1}$ for PPN-6-CH$_2$Cl to 37.5 g L$^{-1}$ for PPN-6-CH$_2$DETA at 295 K and 1.15 bar (the tap densities were measured to be 0.12 and 0.28 g cm$^3$ for PPN-6-CH$_2$CL and PPN-6-CH$_2$DETA respectively).

8. Evaluation of Selective Adsorption

Figure 6:
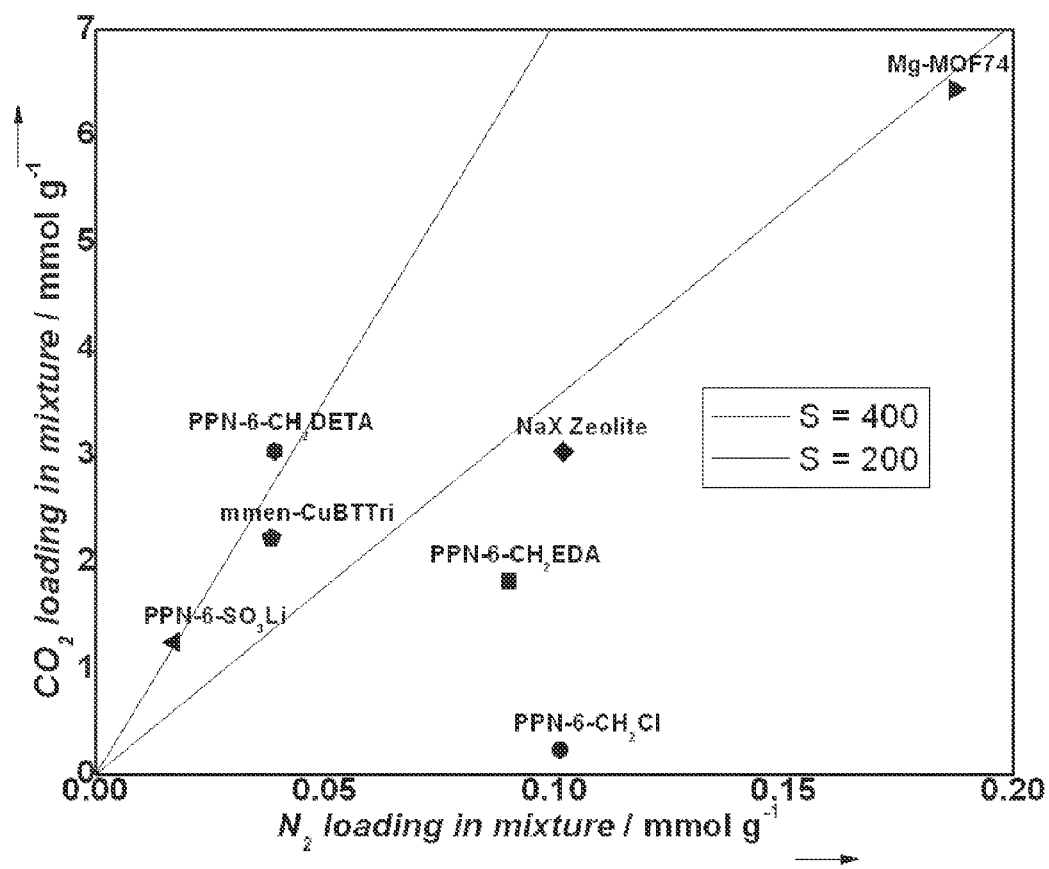
FIG. 6 illustrates LAST calculated component loadings of $N_2$ and $CO_2$ with bulk gas phase partial pressures of 85 kPa and 15 kPa for $N_2$ and $CO_2$, respectively, for materials PPN-6-$CH_2Cl$, PPN-6-$CH_2DETA$, PPN-6-$CH_2EDA$, PPN-6-$SO_3Li$, NaX zeolite, MgMOF-74 and mmen-CuBTTri, according to an embodiment of the invention.

The ideal adsorption solution theory (LAST) model of Myers and Prausnitz was used to evaluate the effectiveness of the polyamine-tethered PPNs for CO$_2$/N$_2$ separation. The adsorption selectivities of PPN-6-CH$_2$—Cl, PPN-6-CH$_2$EDA, PPN-6-CH$_2$DETA, PPN-6-SO$_3$Li, NaX zeolite, MgMOF-74 and mmen-CuBTTri for CO$_2$ over N$_2$ in flue-gas streams (typically 15% CO$_2$ and 85% N$_2$) were determined. These values were estimated from experimental single-component isotherms. FIG. 6 shows the LAST calculated component loadings for each of these compounds.

The inventors have determined that there are two factors for determining whether a material will be efficient for CO$_2$ separation, i) high CO$_2$ loading and ii) high selectivity for CO$_2$ over N$_2$. FIG. 6 clearly shows both factors and highlights the high loading of PPN-6-CH$_2$DETA and exceptional selectivity over N$_2$. The poor N$_2$ adsorption for PPN-6-CH$_2$DETA may be attributed to the low porosity of this compound (0.264 cm$^3$ g$^{-1}$).

9. Material Regeneration Tests

To test the cyclability of PPN-6-CH$_2$DETA, temperature and vacuum swings were simulated and the data was collected with an ASAP2020 analyzer. The PPN was saturated with CO$_2$ at 273 K and a pressure up to 1.1 bar. Upon saturation, the sample was kept under vacuum (0.1 mmHg) for 100 min at a temperature of 80° C. Twenty cycles (adsorption and desorption) were tested to determine whether there was any change in CO$_2$ uptake. The results are shown in FIG. 7.

Figure 7:
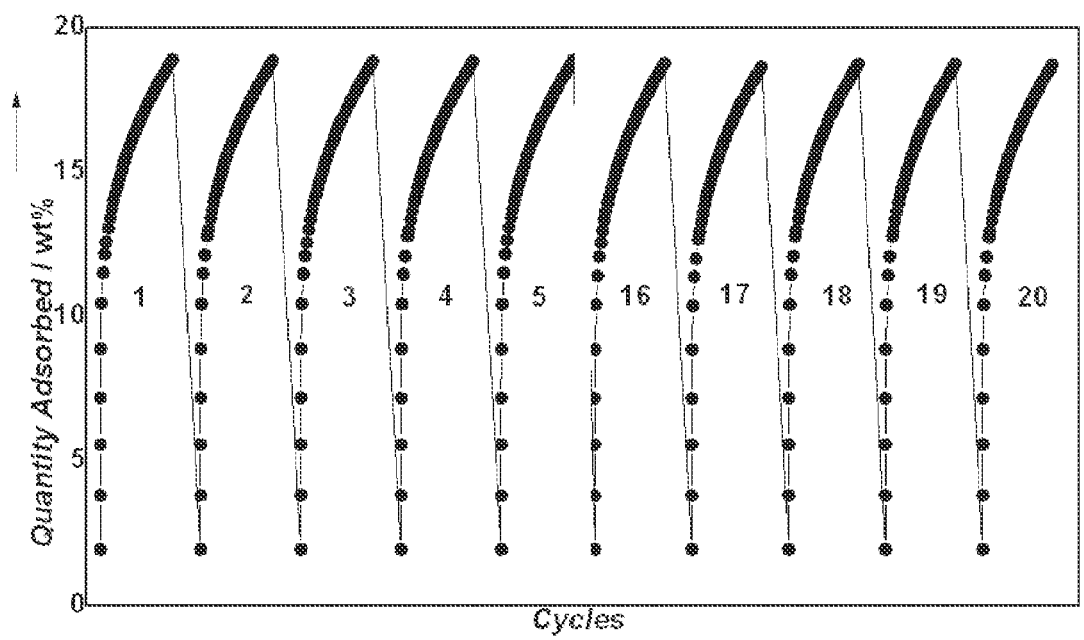
FIG. 7 illustrates the results of a regeneration evaluation performed on PPN-6-$CH_2DETA$, according to an embodiment of the invention.

FIG. 7 demonstrates that after twenty cycles, there was no apparent loss in capacity of the PPN, indicating complete desorption during each regeneration cycle. The energy required for regeneration of PPN-6-CH$_2$DETA is substantially lower than that required for amine solutions, in which the higher chemisorption interactions (~50-100 kJ/mol) necessitate heating the solution, which contain about 70% water, to around 100° C., since the energy consumption is directly linked to the high heat capacity of water (4.15 J g$^{-1}$ K$^{-1}$).

The invention claimed is:

1. A porous polymer network comprising a moiety of Formula (A)

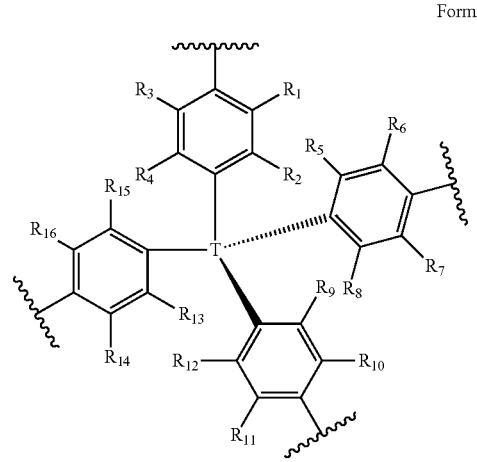

Formula (A)

wherein T is —C, —Si, —Ge, —Sn, —P,—B, —N, —C$_{10}$H$_{16}$, —NO$_2$, —CHO, —OH, —OCH$_3$ or —OCH$_2$CH$_3$, R$_1$ to R$_{16}$ are each independently selected from —H, —F, —Cl, —Br, —I, —OH, —NH$_2$, an alkyl, CH$_2$Q, COQ and SO$_2$Q, wherein Q is a functional group, with the proviso that when at least one of R$_1$ to R$_{16}$ is CH$_2$Q, Q is not an alkyl group, and wherein at least one of R$_1$ to R$_{16}$ is CH$_2$-polyamine.

2. The porous polymer network according to claim 1, wherein T is selected from the group consisting of —C, —Si, —Ge and —C$_{10}$H$_{16}$.

3. The porous polymer network according to claim 1, wherein T is —C or —Si.

4. The porous polymer network according to claim 1, wherein the functional group is selected from an alkyl group having 1 to 6 carbon atoms, an amine and a polyamine.

5. The porous polymer network according to claim 1, wherein the functional group is selected from —C$_3$H$_7$, —C$_4$H$_9$, —C$_5$H$_{11}$ and —C$_6$H$_{13}$.

6. The porous polymer network according to claim 1, wherein the polyamine is represented by N(A$_1$)A$_2$, wherein A$_1$ and A$_2$ are each independently selected from —H, a saturated or unsaturated polyalkylamine and a saturated or unsaturated polyalkarylamine.

7. The porous polymer network according to claim 1, wherein the polyamine is represented by N(A$_1$)A$_2$, wherein A$_1$ and A$_2$ are each independently selected from —H, a branched or unbranched alkyl or a branched or unbranched alkylamine having 1 to 12 carbon atoms which is optionally mono- or polysubstituted by —OH or —NH$_2$, and wherein one or more non-adjacent —CH$_2$ groups is optionally replaced, in each case independently from another by —O—, or —N(A$_3$), wherein A$_3$ is —H, a branched or unbranched alkyl or a branched or unbranched alkylamine having 1 to 12 carbon atoms, with the proviso that at least one of A$_1$ and A$_2$ is not hydrogen.

8. The porous polymer network according to claim 7, wherein N(A$_1$)A$_2$ is selected from the group consisting of:

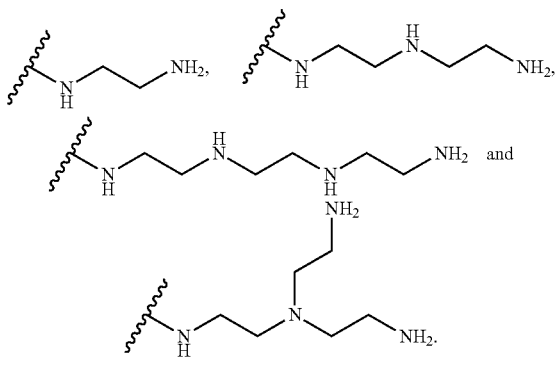

9. The porous polymer network according to claim 8, wherein N(A$_1$)A$_2$ is

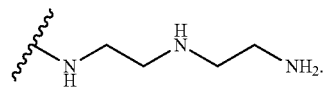 [SMILES: *NCCNCCN]

10. The porous polymer network according to claim 1, wherein the proportion of amine per gram of the porous polymer network is in the range of 1 to 1000 mmol.

11. A method of preparing a porous polymer network, comprising:
(a) a step of homo-coupling a monomer of formula 1

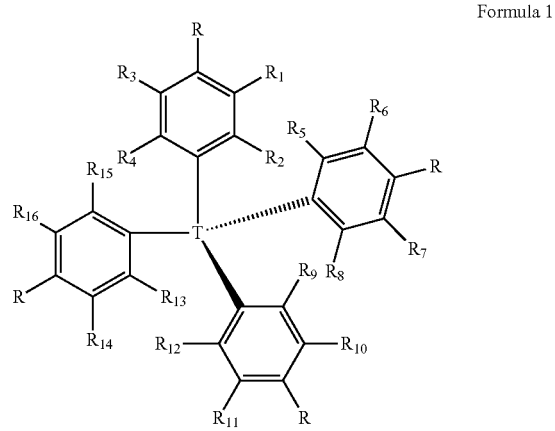

Formula 1 in the presence of 2,2'-bipyridyl, 1,5-cyclocta-1,5-diene, a mixed solvent of DMF/THF and a compound or mixture selected from the group consisting of bis(1,5-cyclocta-1,5-diene)nickel(0), $Ni(PPH_3)_4$ and $Zn/NiCl_2/NaBr/PPH_3$, at a temperature in the range of 20 to 40° C., wherein T is —C, —Si, —Ge, —Sn, —P, —B, —N, —$C_{10}H_{16}$, —$NO_2$, —CHO, —OH, —$OCH_3$ or —$OCH_2CH_3$, R is —F, —Cl, —Br, —I, an alkenyl group or an alkynyl group, $R_1$ to $R_{16}$ are each independently selected from —H, —F, —Cl, —Br, —I, —OH, —$NH_2$ and an alkyl group; and (b) a step of functionalizing the product obtained in step (a) with $CH_2Q$ wherein Q is a polyamine.

12. The method according to claim 11, wherein T is selected from the group consisting of —C, —Si, —Ge and —$C_{10}H_{16}$.

13. The method according to claim 11, wherein T is —C or —Si.

14. The method according to claim 11, wherein the polyamine is represented by formula $N(B_1)B_2$, wherein $B_1$ and $B_2$ are each independently selected from —H, a saturated or unsaturated polyalkylamine and a saturated or unsaturated polyalkarylamine.

15. The method according to claim 11, wherein the polyamine is represented by formula $N(B_1)B_2$, wherein $B_1$, and $B_2$ are each independently selected from —H, a branched or unbranched alkyl or a branched or unbranched alkylamine having 1 to 12 carbon atoms which is optionally mono- or polysubstituted by —OH or —$NH_2$, and wherein one or more non-adjacent —$CH_2$ groups is optionally replaced, in each case independently from another by —O—, or —$N(A_3)$, wherein $A_3$ is —H, a branched or unbranched alkyl or a branched or unbranched alkylamine having 1 to 12 carbon atoms, with the proviso that at least one of $B_1$ and $B_2$ is not hydrogen.

16. The method according to claim 11, wherein the ratio of THF to DMF is in the range of 1:10 to 10:1.

17. A method of storing a gas comprising incorporating a gas into the porous polymer network according to claim 1.

18. The method of storing a gas according to claim 17, wherein the gas is $CH_4$.

19. A method of separating a gas from a gaseous mixture, comprising a step of contacting the gaseous mixture with a porous polymer network according to claim 1 such that a selected gas is incorporated into the porous polymer network and is thereby separated from the gaseous mixture.

20. The method according to claim 19, wherein the gaseous mixture comprises $CO_2$ and $N_2$.

* * * * *